United States Patent [19]
McDowell

[11] Patent Number: 6,152,527
[45] Date of Patent: Nov. 28, 2000

[54] VEHICLE SEAT HAVING REMOVABLE LIFE VESTS

[75] Inventor: Robert Flint McDowell, Branson, Mo.

[73] Assignee: Ozarks Scenic Tours, Inc., Branson, Mo.

[21] Appl. No.: 09/342,421

[22] Filed: Jun. 29, 1999

[51] Int. Cl.$^7$ ........................................ A47C 7/62
[52] U.S. Cl. ........................ 297/217.1; 297/188.04; 441/127
[58] Field of Search .......................... 297/217.1, 188.04, 297/188.06; 441/126, 127

[56] References Cited

U.S. PATENT DOCUMENTS

| | | | |
|---|---|---|---|
| 802,275 | 10/1905 | Fentrick . | |
| 2,429,050 | 10/1947 | Decker | 297/188.13 |
| 4,306,748 | 12/1981 | Sullivan | 297/217.1 X |
| 4,619,623 | 10/1986 | Elverskog | 441/126 |
| 5,342,109 | 8/1994 | Berry et al. | 297/217.1 X |
| 5,803,544 | 9/1998 | Block et al. | 297/188.04 X |

*Primary Examiner*—Peter R. Brown
*Attorney, Agent, or Firm*—Shook, Hardy & Bacon L.L.P.

[57] ABSTRACT

A passenger seat for a vehicle which travels over or on water includes a base attached to the vehicle and for supporting the lower extremities of the passenger. A seat back extends upwardly from the base and supports the back of the passenger. At least one life vest constitutes a portion of the seat back. The life vest is capable of being removed from the seat back to provide flotation assistance to the passenger.

4 Claims, 3 Drawing Sheets

VEHICLE SEAT HAVING REMOVABLE LIFE VESTS

FIELD OF THE INVENTION

This invention relates to a seat for a vehicle that travels on or over water, and, more particularly, to a vehicle seat that has removable life vests incorporated therein that can be easily removed by a passenger during an emergency situation.

BACKGROUND OF THE INVENTION

Coast Guard regulations, and other maritime regulations, often require that life vests be provided for each passenger in a vehicle traveling on or over water. In particular, these types of vehicles can include recreational and commercial boats, ships, amphibious vehicles, and hovercrafts. The storage of a sufficient number of life vests in an accessible position to the passengers has long been a worrisome problem. In particular, the life vests must be stored so that they can be easily accessed and implemented by a passenger in an emergency situation.

A major problem of storing life vests is found in the commercial and recreational boats and amphibious vehicle touring service. In particular, for example, amphibious vehicles are oftentimes used to provide combination land and water tours. Tourists have found such tours to be extremely pleasing, and the use of such vehicles has become increasingly popular. These tours offer a passenger the ability to see both landlocked sites and sites located adjacent to or near water. Additionally, the tours offer the excitement of driving or "splashing" a wheeled vehicle into water which then becomes a marine vessel. Typically, these amphibious vehicles are open air vehicles so that a passenger can get sufficient views of the attractions in the area. In order to have the life vests at a readily accessible position, oftentimes they are hung at a location above the passenger seats on a canopy frame that covers the passenger area. As is apparent, the location of life vests in the canopy area of an amphibious vehicle can hinder the passenger's sightseeing ability.

A further problem in commercial and recreational boats and amphibious vehicles is that in situations where life jackets are necessary, oftentimes the stability of the vessel has been compromised. Traditionally, passengers have had to leave their seats and go to the area where the lifejackets are stowed. The act of locating and putting on the life jackets creates limited access in aisleways and the weight shift produced by the movement of the passengers adds to the instability of the vessel.

Therefore, a passenger seat/life vest arrangement is needed which overcomes the problems of the prior art life vest storing arrangements.

SUMMARY OF THE INVENTION

Accordingly, it is an object of the present invention to provide a passenger seat wherein the life vest is easily accessible to passengers without causing additional instability to the vessel or causing aisleway obstructions.

It is a further object of the present invention to provide a passenger seat wherein one or more life vests forms a portion of the back of the seat and is easily accessible to passengers.

It is a still further object of the present invention to provide a passenger seat wherein one or more life vests form at least a portion of the cushioning needed for the back of the seat.

It is yet another object of the present invention to provide a passenger seat wherein the position of the life vest is readily apparent to the passengers.

A still further object of the present invention is to provide a life vest arrangement wherein life vests located adjacent passengers do not need to be inflated and are of a form that passengers are accustomed to.

Another object of the present invention is to provide a passenger seat arrangement wherein the life vests can be easily accessed simply by pulling a cover off the life vests, the cover serving to maintain the life vests in position such that they form a portion of the back of the seat.

Accordingly, the present invention provides for a passenger seat for a vehicle which travels on or over water. The seat includes a base adapted to be attached to the vehicle and for supporting the lower extremities of the passenger. A seat back extends upwardly from the base and supports the back of the passenger. At least one life vest constitutes a portion of the seat back. The life vest is capable of being removed from the seat back to provide flotation assistance to the passenger.

The present invention further provides for the seat back including a generally rigid support. The generally rigid support supports the life vest in such a manner that the life vest constitutes a portion of the seat back.

The invention further provides for a removable sleeve covering both the life vest and the rigid support and maintaining the life vest in position relative to the rigid support such that a seat back is generally formed by the rigid support and the life vest.

Additional objects, advantages, and novel features of the invention will be set forth in part in a description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith, and in which like reference numerals are used to indicate like parts in the various views:

FIG. 5 is an exploded front elevational view, showing the seat back cover removed, and a life vest in a partially removed position;

DETAILED DESCRIPTION OF THE PREFERRED EMBODIMENTS

Figure 1:
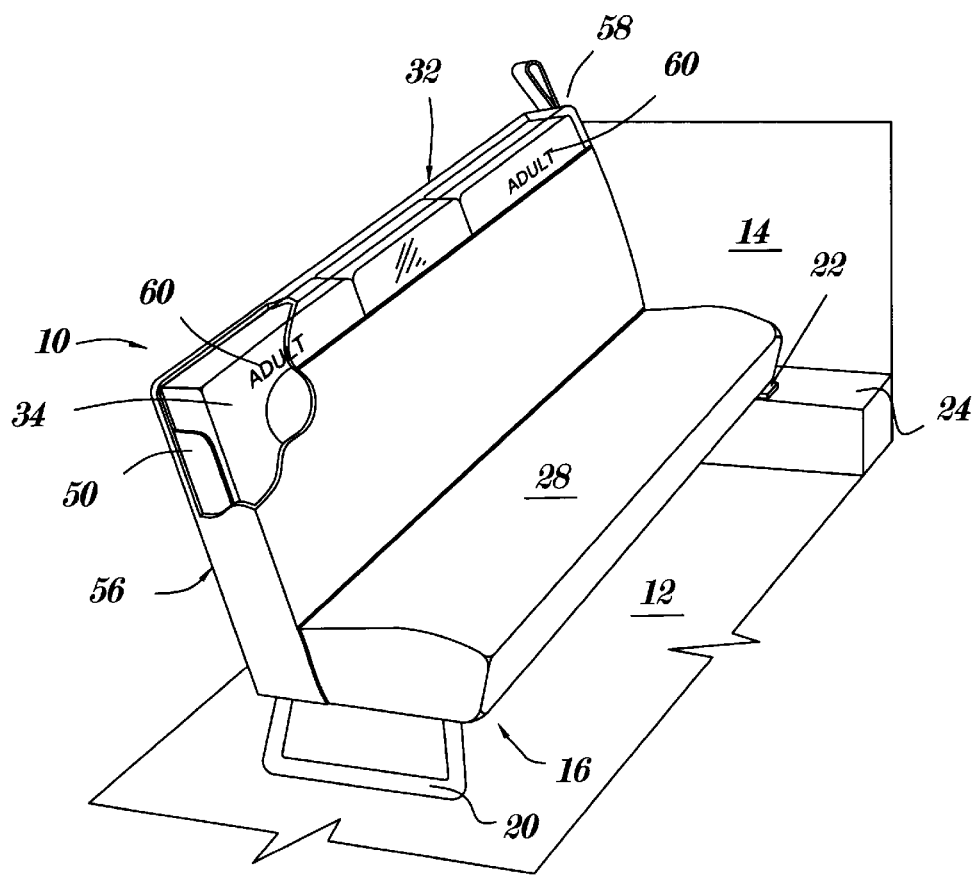
FIG. 1 is a top perspective view of a passenger seat embodying the present invention, parts being broken away to reveal details of construction.
Figure 2:
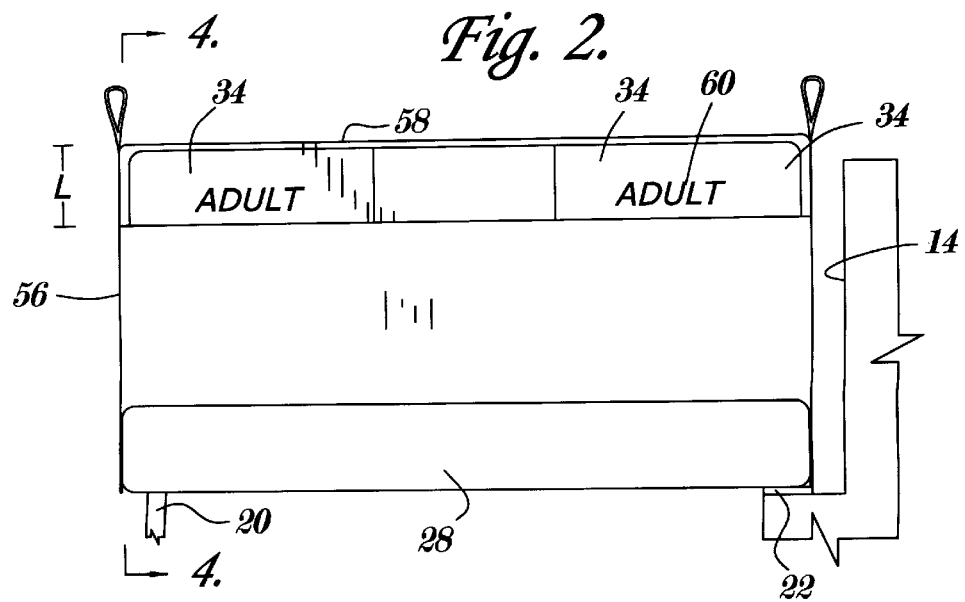
FIG. 2 is a front elevational view of the passenger seat shown in FIG. 1.
Figure 4:
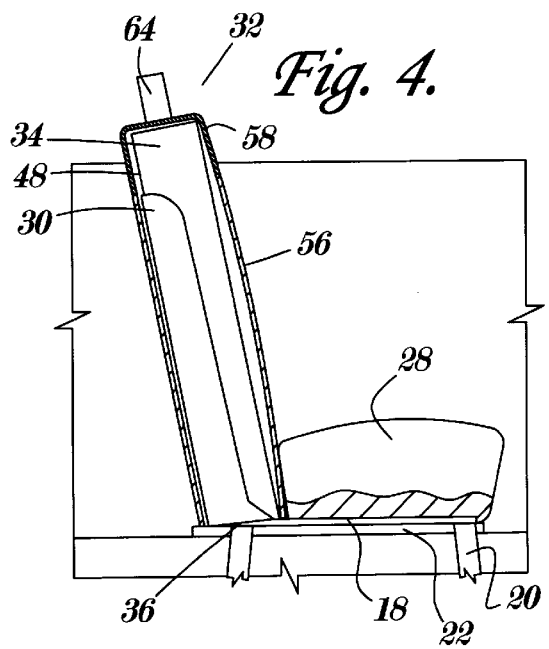
FIG. 4 is a cross-sectional view taken generally along line 4—4 of FIG. 2.
Figure 7:
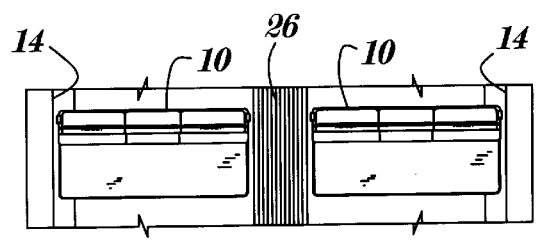
FIG. 7 is a fragmentary, top plan view of the interior of an amphibious vehicle showing the positioning of two adjacent passenger seats and an aisle therebetween.

Referring to the drawings in greater detail, and initially to FIG. 1, a passenger seat incorporating the present invention is generally designated by the numeral 10. Seat 10 is secured to a support surface 12 of a vehicle and a side surface 14 of a vehicle via a base structure 16. Base structure 16 is used to support the lower extremities of the passenger in a seated position. Base structure 16 includes a horizontally disposed support base plate 18 which serves as the main support structure for seat 10, as best shown in FIGS. 4 and 5. Plate 18 is supported at an elevated position above surface 12 by a combination of supporting bracket 20 which extends upwardly from surface 12 and is connected to plate 18 and by an elongated side supporting plate 22 which is attached to ledge 24 of side surface 14. Thus, plate 18 is supported at its elevated location by the attachment to side surface 14 via plate 22 and by the attachment to surface 12 via bracket 20. Both bracket 20 and plate 22 can be attached to their respective surfaces in any suitable manner, for instance, welding or bolting. Seat 10 is generally configured to allow an aisle in a vehicle, such as an amphibious vehicle. In particular, seat 10 is configured to use in conjunction with a second seat 10 aligned therewith between the side walls 14 of a vehicle, and thus provide for an aisle extending between the seats. More specifically, this orientation is generally shown in FIG. 7, wherein aisle 26 is formed between adjacent pairs of seats 10. Brackets 20 of the seats 10 are located adjacent aisle 26.

Base plate 18 has attached to an upper surface thereof a cushion 28. Cushion 28 can be formed of foam rubber, or can have any suitable spring structure to provide support and comfort to the lower extremities of the passenger.

Figure 3:
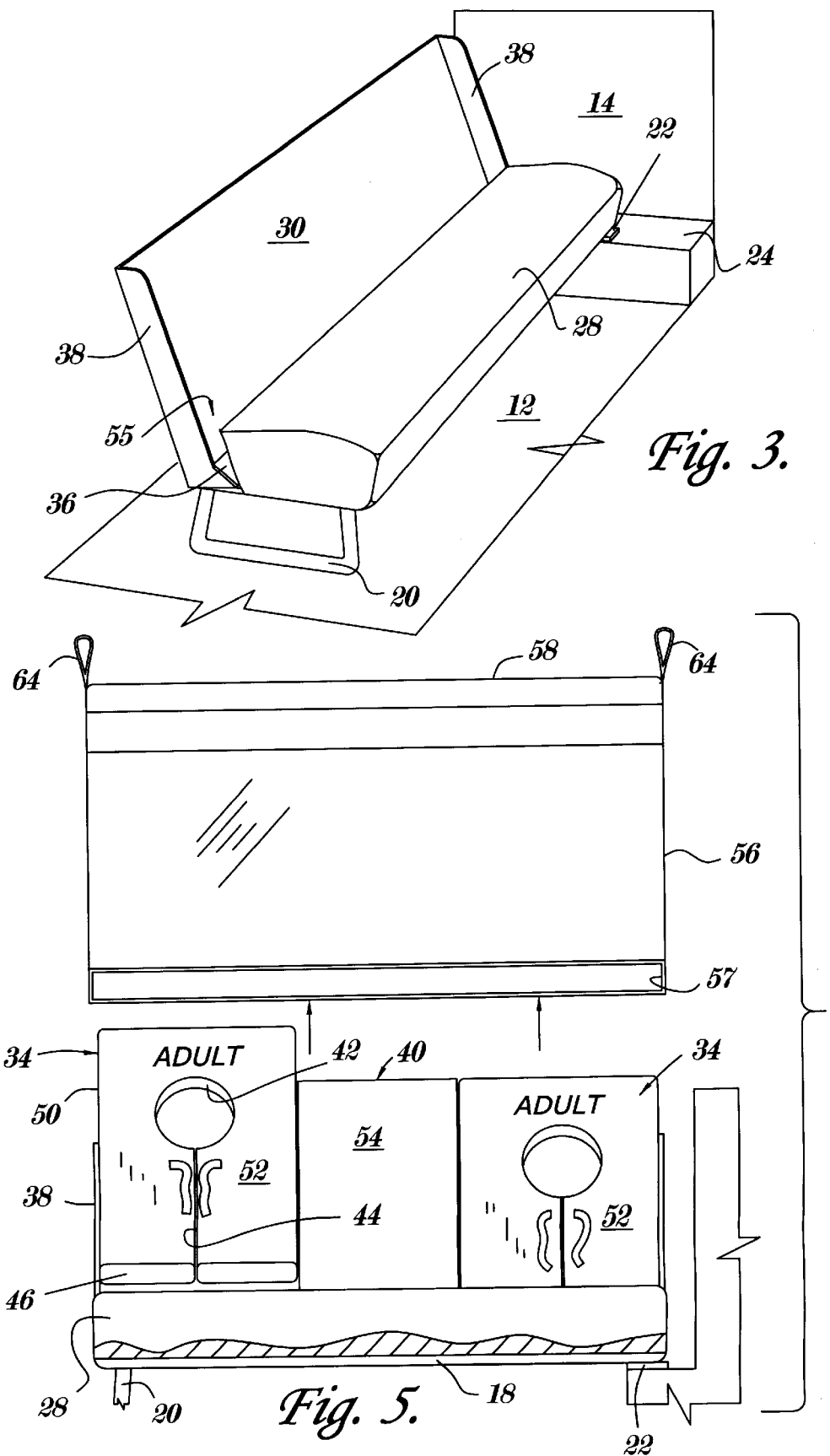
FIG. 3 is a top perspective view of the passenger seat shown in FIG. 1 with the seat back cover, and life vests removed from the seat.

Fixedly attached to base plate 18 and extending upwardly therefrom is a back support plate 30 as is best shown n FIG. 3. Back plate 30 can be attached to base plate 18 in any suitable manner, such as welding or bolting. Plate 30 extends at an angle to plate 18 such as to provide a reclining orientation to the resulting seat back 32, which is made up of a combination of plate 30 and life vests 34, as will be more fully described below. Plate 30 extends the entire length of base 18 and has a forwardly extending support flange 36 which is used to support the bottom edges of life vest 24, as will be more fully described below. Plate 30 also has a pair of side containing plates 38 which provide side support for life vests 34. Plate 30 thus generally provides a containing area for life vests 34, wherein the life vests are supported along a back surface, side surfaces, and a bottom surface, as will be more fully described below.

Each seat back 32 includes two adult life vests 34 and a foam spacer block 40. In particular, life vests 34 are generally of a suitable foam flotation construction having a rectangular box-type shape with a head opening 42 associated with each life vest. Additionally, each life vest 34 has a split 44 associated therewith extending downwardly from opening 42 which allows a passenger to position his or her head within opening 42 to position the life vest in its operating orientation.

In order to constitute a seat back 32, as best shown in FIGS. 4 and 5, two life vests 34 are positioned such that the lower surfaces 46 thereof engage flange 36, such that rear surfaces 48 thereof engage plate 30, and such that one of the side surfaces 50 thereof engage side plates 38. Foam block spacer 40 is positioned between vests 34. In this manner, the back, rear, and bottom surfaces of the life vests 34 are generally supported to form a seat back, and the front surfaces 52 of the life vests 34 and the front surface 54 of the foam block 40 face the back of a passenger when the passenger is seated on seat 10.

Life vests 34 can be easily removed from plate 30 simply by pulling upwardly thereon and discarding foam block 40.

In order to keep life vests 34 and foam block 40 in position, a slot 55 is generally formed between cushion 28 and plate 30 adjacent the lower edges of the life vests, as best seen in FIG. 3.

Additionally, with reference to FIGS. 4 and 5, to maintain and secure life vests 34 in position and also give the appearance of an upholstered seat, a removable envelope or cover 56 is provided. Cover 56 generally has an opening 57 adjacent its bottom end which is capable of being slid over plate 30, life vests 34, and foam block 40 to cover the front, sides, back, and top of these structures.

Cover 56 includes a transparent portion 58 along its upper surface, and extending downwardly a distance L therefrom. In particular, transparent area 58 comprises the entire upper surface of cover 56 and extends downwardly the distance L on both the front, back and sides of cover 56. Therefore, cover 56 is completely transparent along its upper portion, and is opaque downwardly therefrom. Transparent area 58 allows a passenger to see life vests 34 which are incorporated into seat back 32. In particular, a passenger sitting in the seat behind seat 10 can readily see the tops of life vests 34 and the labeling 60 on the life vests. Additionally, each life vest 34 can also have reflective tape or coating associated therewith, which further brings the life vests to the attention of the passenger, and also can aid in night time emergencies if necessary. In addition to labeling 60, labeling can also be applied to both sides of the life vest and on a top surface thereof such that passengers in all locations and from all orientations are aware of the presence and orientation of the life vests.

Cover 56 also has loops 64 associated therewith which are used to remove cover 56 from life vests 34 to allow a passenger to remove the life vests from seat back 32 and utilize the life vests, as will be more fully described below.

In operation, each seat 10 is constructed with the life vests 34 positioned adjacent the supporting plate 30 with their lower ends in slot 55 and separated from one another by foam block 40. Thus, life vests 34 and foam block 40 create the cushioning associated with seat back 32. Thereafter, cover 56 with its open end 57 is positioned over life vests 34, foam block 40, and plate 30. Cover 56 extends downwardly into slot 55 and securely holds life vests 34 and foam block 40 to plate 30 to form the appearance of an upholstered seat back 32 as best shown in FIG. 4. However, transparent portion 58 allows passengers to clearly see that life vests 34 are positioned within seat back 32. In an emergency situation, a passenger simply utilizes loops 64 to remove cover 56 from life vests 34 and foam block 40. Foam block 40 can then be discarded, and life vests 34 can be positioned on the passengers.

Figure 6:
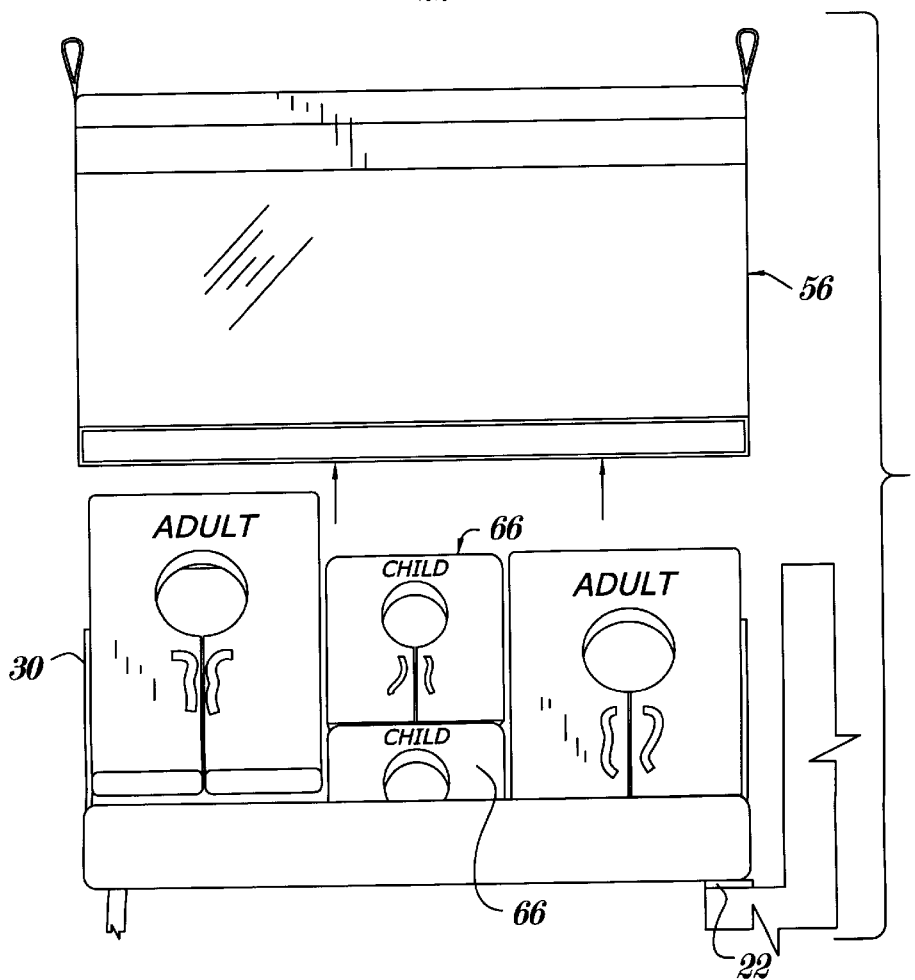
FIG. 6 is a view similar to FIG. 5, but showing an alternative embodiment, wherein child life vests are positioned in place of a foam spacer.

As best shown in FIG. 6, it is an option to put in place of foam block 40 a pair of children's life vests 66. In this manner, the children's life vests provide the spacing between the adult life vests 34.

As is apparent, the above structure provides a highly advantageous orientation for the life vests directly in front of or behind the passengers. Additionally, the use of the flotation material of the life vest as a cushion provides an advantageous savings of space in the vehicle. The transparent area 58 of the cover 56 allows a passenger to immediately see the location of the life vests when the passenger sits in seat 10. As is apparent, a passenger need not leave his/her seating area to obtain a life vest 34, and can simply do so by removing cover 56. Thus, there is no additional instability caused by passengers putting on life jackets and blockage of the aisleway is limited. Life vests 34 are also of a conventional nature, and do not need to be inflated or need extra special instructions to understand the operation. Life vests 34 have head openings 42 which are familiar life vest structures for most people. Additionally, because life vests 34 form at least a portion of seat backs 32, they are not disposed at a location that could interfere with the line of sight of the passengers.

From the foregoing, it will be seen that this invention is one well-adapted to attain all the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of this invention without departing from the scope thereof, it is to be understood that all matter herein set forth or shown in the accompany drawings is to be interpreted as illustrative and not in a limiting sense.

What is claimed is:

1. A passenger seat for a vehicle which travels on or over water, the seat comprising:
    a base adapted to be attached to the vehicle and supporting the lower extremities of a passenger;
    a seat back extending upwardly from said base and supporting the back of the passenger;
    at least one life vest constituting at least a portion of said seat back, said life vest capable of being removed from said seat back to provide flotation assistance to a passenger; and
    a removable sleeve, said sleeve at least partially covering said life vest and being capable of removal from said life vest to allow a passenger access to said life vest, wherein said removable sleeve has a transparent portion which allows a passenger to see said life vest.

2. A passenger seat for a vehicle which travels on or over water, the seat comprising:
    a base adapted to be attached to the vehicle and supporting the lower extremities of a passenger;
    a seat back extending upwardly from said base and supporting the back of the passenger;
    at least one life vest constituting at least a portion of said seat back, said life vest capable of being removed from said seat back to provide flotation assistance to a passenger, wherein said seat back is constituted mainly by a pair of life vests arranged in a side by side orientation and wherein a child's life vest is positioned between said pair of life vests.

3. A passenger seat for a vehicle which travels on or over water, the seat comprising:
    a base adapted to be attached to the vehicle and supporting the lower extremities of a passenger;
    a rigid support extending upwardly from said base;
    at least one life vest engaging said rigid support, wherein said rigid support and said life vest act together to support the back of a passenger and wherein said life vest is capable of being removed from said rigid support to provide flotation assistance to a passenger; and
    a removable sleeve, said sleeve at least partially covering said life vest and said rigid support and being capable of removal from said life vest to allow a passenger access to said life vest wherein said removable cover has a transparent portion which allows a passenger to see said life vest.

4. A passenger seat for a vehicle which travels on or over water, the seat comprising:
    a base adapted to be attached to the vehicle and supporting the lower extremities of a passenger,
    a rigid support extending upwardly from said base; and
    at least one life vest engaging said rigid support, wherein said rigid support and said life vest act together to support the back of a passenger and wherein said life vest is capable of being removed from said rigid support to provide flotation assistance to a passenger, and wherein a pair of life vests engage said rigid support and wherein said pair of life vests are arranged in a side-by-side orientation and wherein a child's life vest is positioned between said pair of life vests.

* * * * *